US008458028B2

(12) United States Patent
Altieri (10) Patent No.: US 8,458,028 B2
(45) Date of Patent: Jun. 4, 2013

(54) SYSTEM AND METHOD FOR INTEGRATING BUSINESS-RELATED CONTENT INTO AN ELECTRONIC GAME

(75) Inventor: Frances Barbaro Altieri, Belmont, MA (US)

(73) Assignee: Barbaro Technologies, Belmont, MA (US)

( * ) Notice: Subject to any disclaimer, the term of this patent is extended or adjusted under 35 U.S.C. 154(b) by 1161 days.

(21) Appl. No.: 10/272,408

(22) Filed: Oct. 16, 2002

(65) Prior Publication Data

US 2004/0078263 A1   Apr. 22, 2004

(51) Int. Cl.
*G06Q 30/00*   (2012.01)
(52) U.S. Cl.
USPC .............. 705/14.4; 705/14.49; 705/14.12; 463/40
(58) Field of Classification Search
USPC ............ 705/14.4, 14.49, 14.12, 1, 26, 14, 705/6, 7, 8, 9, 10; 273/430; 463/40, 29, 42
See application file for complete search history.

(56) References Cited

U.S. PATENT DOCUMENTS

| 5,742,521 | A |   | 4/1998  | Ellenby et al. |
|-----------|---|---|---------|----------------|
| 5,946,664 | A | * | 8/1999  | Ebisawa ............................ 705/14 |
| 5,956,038 | A | * | 9/1999  | Rekimoto ...................... 345/419 |
| 6,099,408 | A | * | 8/2000  | Schneier et al. ................ 463/29 |
| 6,243,104 | B1 | * | 6/2001 | Murray ........................... 345/629 |
| 6,409,599 | B1 |   | 6/2002 | Sprout et al. |
| 6,595,859 | B2 | * | 7/2003 | Lynn ................................ 463/42 |
| 6,648,479 | B1 |   | 11/2003 | Gustafsson et al. |
| 6,669,564 | B1 | * | 12/2003 | Young et al. .................... 463/42 |
| 6,795,041 | B2 |   | 9/2004 | Ogawa et al. |
| 6,871,137 | B2 |   | 3/2005 | Scaer et al. |
| 7,025,674 | B2 | * | 4/2006 | Adams et al. ..................... 463/1 |
| 7,073,129 | B1 | * | 7/2006 | Robarts et al. ................ 715/740 |

(Continued)

FOREIGN PATENT DOCUMENTS

WO   WO 93/22017   * 11/1993

OTHER PUBLICATIONS

Bonelle, D. "Nike", New Media Age, pNA, Nov. 18, 1999, Dialog, file 16, No. 06835000.*

(Continued)

*Primary Examiner* — Dean T Nguyen
(74) *Attorney, Agent, or Firm* — Jean C. Edwards, Esq.; Edwards Neils PLLC (57) ABSTRACT

A method of integrating business-related content into the execution of a game application is disclosed. A player of the game application is exposed to the business-related content within the context of the game. User actions within the game cause the game application to transparently re-direct the user to a customized corporate web site containing selected information from a business sponsor. Game-related user actions performed while the player is at the customized corporate web site cause the player to be exposed to additional business-related content from the business sponsor. The player may earn benefits while at the customized corporate web site. Some of the player benefits are real-life benefits external to the game application which may be utilized by the player after finishing the game. A record of external benefits is kept by the business sponsor. Other benefits may be immediately available to the player by pausing the game, thereby allowing the player to access the sponsor's reward program. Following the occurrence of a pre-determined event, the game application transparently re-directs the player back to the original game site.

9 Claims, 5 Drawing Sheets

U.S. PATENT DOCUMENTS

| | | | |
|---|---|---|---|
| 7,162,054 | B2 | 1/2007 | Meisner et al. |
| 7,570,261 | B1 | 8/2009 | Edecker et al. |
| 7,676,372 | B1 | 3/2010 | Oba |
| 7,693,702 | B1 | 4/2010 | Kerner et al. |
| 2002/0002076 | A1 | 1/2002 | Schneier et al. |
| 2002/0007276 | A1* | 1/2002 | Rosenblatt et al. ............ 704/260 |
| 2002/0096831 | A1* | 7/2002 | Nakayama et al. ............ 273/430 |
| 2002/0198052 | A1* | 12/2002 | Soltys et al. ..................... 463/42 |
| 2003/0004791 | A1* | 1/2003 | Kojima ........................... 705/12 |
| 2003/0064807 | A1* | 4/2003 | Walker et al. .................. 463/42 |
| 2003/0069832 | A1* | 4/2003 | Czepluch ........................ 705/37 |
| 2004/0004583 | A1 | 1/2004 | Ogawa et al. |
| 2004/0095378 | A1 | 5/2004 | Vigue et al. |
| 2004/0113887 | A1 | 6/2004 | Pair et al. |
| 2004/0131232 | A1 | 7/2004 | Meisner et al. |
| 2004/0242327 | A1* | 12/2004 | Shahar ............................ 463/42 |
| 2005/0035980 | A1 | 2/2005 | Lonsing |
| 2005/0131582 | A1 | 6/2005 | Kazi et al. |
| 2005/0251494 | A1 | 11/2005 | Maria Jansen |

OTHER PUBLICATIONS

"Two million games. . . . Software" PR Newswire, Sep. 26, 2001. Dialog, File 20, No. 190 16252.*
www.TerraZones.com.*
"Advegaming", Aug. 16, 2001, pp. 1-4.*
Bonello, D. "Nike", New Media Age, Nov. 18, 1999, Dialog Fil3 16: 06835000.*
Buckner, K. "Advergaming . . . Internet Advertising", Feb. 2003.*
Prentice, K. "Ads run . . . video screens", Media Life, Jul. 23, 2001.*
Wright, C. M. "Imagineering the Future of the Internet . . . 2010", ASIS, Apr./May 1999, pp. 1-6.*
Clark, Don "The Affluent Avatar" *The Wall Street Journal*, col. 2, p. 1, Sec. B (Jan. 8, 2003).
Electronic Arts "EA.com$^{SM}$ Electronic Arts: get in the game [media kit]" <http://retailsupport.ea.com/webmediakit/pdf/mediakit.pdf> accessed Jan. 9, 2003 [publication date unknown].

* cited by examiner

SYSTEM AND METHOD FOR INTEGRATING BUSINESS-RELATED CONTENT INTO AN ELECTRONIC GAME

FIELD OF THE INVENTION

The illustrative embodiment of the present invention relates generally to electronic games and more particularly to the integration of business-related content into a computer game.

BACKGROUND

The number of people playing electronic games has increased substantially in recent years. These people represent a significant target audience for businesses. A number of methods are used by companies to help attract the business of game players, such as sponsorship of games, sponsorship of gaming competitions, and the insertion of promotional material into game packaging to increase participant awareness of a particular business. Unfortunately, the companies frequently lose the attention of the players and the associated opportunity to interact with players upon the commencement of the game. The conventional methods of advertising limit the opportunity to capture the attention of the player of the game application to a period of time before the start of a game and a period of time after the end of the game, since during the game the user is focused on the game play. During both periods of time, before and after game play, the player of the game application may ignore the business-related content that a business wishes to convey to the player.

BRIEF SUMMARY OF THE INVENTION

The illustrative embodiment of the present invention provides a method of seamlessly integrating business-related content into the subject matter of an electronic game. The electronic game, which may be executed on a local device or via a network connection to a remote server, exposes the player to branded business-related content. The term branded refers to business-related content which uniquely identifies the goods and services of a particular company. The game requires the user to perform certain tasks specified in the game. In the course of conducting the tasks, the user is transparently re-directed to a corporate sponsor's customized web site to finish the completion of a task. While at the sponsors corporate web site, the game player is exposed to additional business-related content which relates to the game the user is playing. All of the business-related content displays occur within the context of the player playing the game. The player has the opportunity to temporarily leave the game and acting upon the business-related content to which he or she has been exposed in order to conduct real-life business at the corporate web site. Following completion of the task at the customized corporate web site, the player is transparently re-directed back to the original game site. The game provides the opportunity for the player to earn extra benefits as a result of the game actions. Some of the benefits are for internal use within the game while other benefits are external to the game for later use with the various businesses providing the business-related content. For example, the game player may earn real life points towards hotel chain rewards programs or frequent flyer miles towards airlines reward programs.

In one aspect of the illustrative embodiment of the present invention, a primary electronic device holding a game application is part of a network along with a secondary electronic device holding business-related content. The primary electronic device receives a request from a user to initiate the game application. The game application is initiated and integrates business-related content into the game application during the execution of the game application.

In another aspect of the illustrative embodiment of the present invention, an electronic device holding a game application is interfaced with a network. The network has at least one secondary electronic device holding business-related content. The game application is initiated in response to a user request. The user playing the game is re-directed from the electronic device to a customized web page on the secondary electronic device. The re-direction is integrated into the game application and occurs as part of the user executing and playing the game application. The customized web page at the secondary electronic device is customized with business-related content for use with the game application.

In an aspect of the illustrative embodiment of the present invention, a system includes a primary electronic device holding a game application. The game application is initiated in response to a user request. The system also includes a virtual reality platform interfaced with the electronic device holding the game application. The virtual reality platform provides a three dimensional effect to the user while the user is playing the game. The system additionally includes a secondary electronic device which is interfaced with the primary electronic device over a network. The secondary electronic device holds a web page customized with business-related content which is used in conjunction with the game application. The user is re-directed to the customized web page from the primary electronic device as part of the execution of the game application.

In a further aspect of the illustrative embodiment of the present invention a network includes a primary electronic device holding a game application and at least one secondary electronic device holding business-related content. A virtual reality platform is provided which is interfaced with the primary electronic device. The virtual reality platform provides a three dimensional effect to the user during gameplay. The game application is initiated in response to user request. During the execution of a game application, the content source for the virtual reality platform is re-directed from the primary electronic device to a customized web page on the secondary electronic device. The re-direction occurs as part of the execution of the game application. The web page is customized with business-related content for use with the game application.

DETAILED DESCRIPTION

The illustrative embodiment of the present invention provides a method of integrating business-related content into the execution of a game application. A player of the game application is exposed to the business-related content within the context of the game. User actions within the game cause the game application to automatically re-direct the user to a customized corporate web site containing selected information from a business sponsor. Game-related user actions performed while the player is at the customized corporate web site cause the player to be exposed to additional business-related content from the business sponsor. The additional content is displayed to the player within the context of the game. The player may earn benefits while at the customized corporate web site. Some of the player benefits are real-life benefits external to the game application and may be utilized by the player after finishing the game. A record of external benefits is kept by the business sponsor. Other benefits may be immediately available to the player by pausing the game, thereby allowing the player to access the sponsor's reward program. Additional benefits are used by the player within the context of the game. Following the occurrence of a pre-determined event, the game application re-directs the player back to the original game site.

For the sake of clarity in explaining the invention, the description herein focuses on the integration of business-related content into the game application. However, those skilled in the art will appreciate that the content being integrated into the game application may be business-related content and/or non business-related content. Examples of non-business related content include, but is not limited to, art content, historical data, geographical content, literature content, etc.

Figure 1:
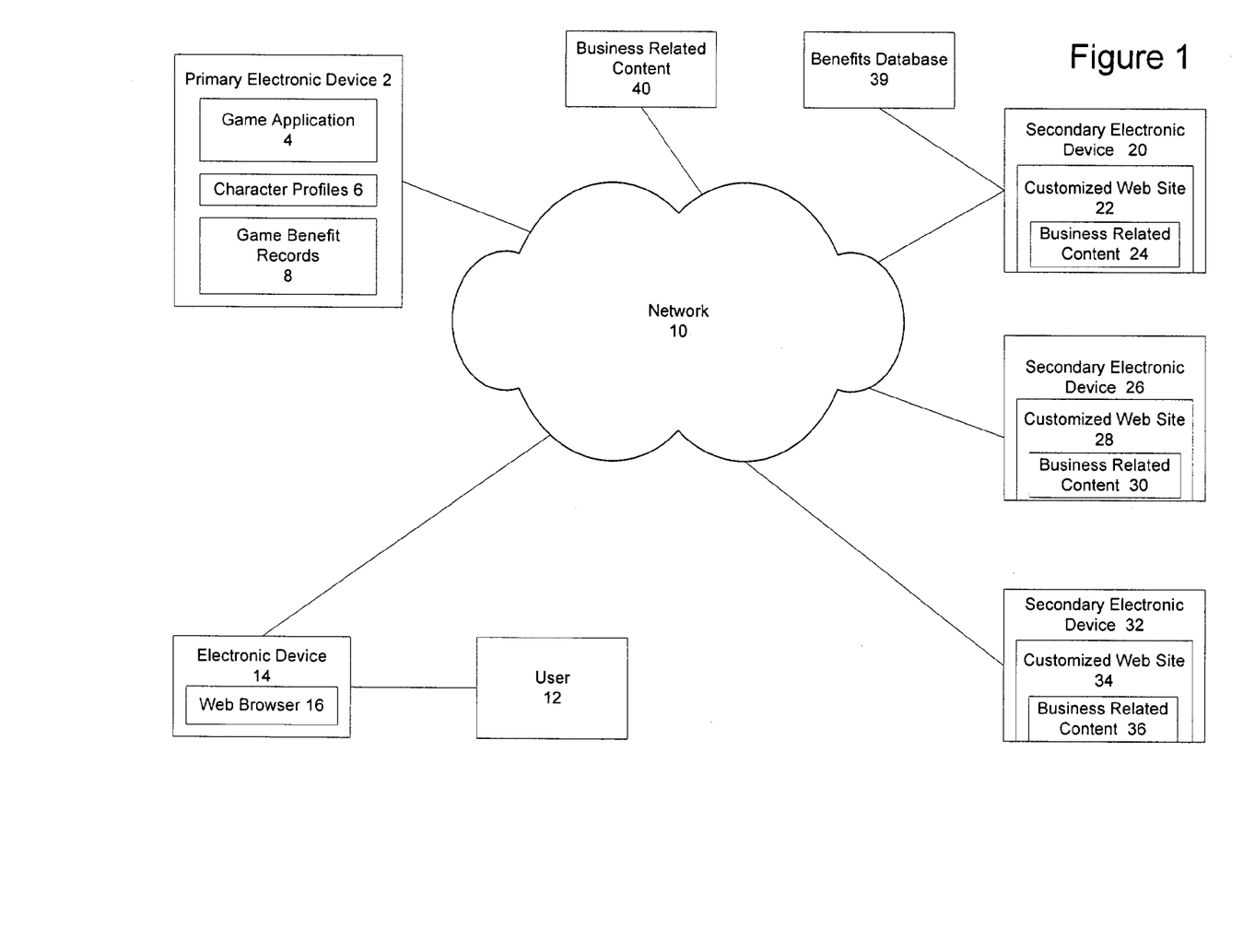
FIG. 1 depicts a block diagram of an environment suitable for practicing the illustrative embodiment of the present invention where the game is initiated over a network.

FIG. 1 depicts an environment suitable for practicing the illustrative embodiment of the present invention. A primary electronic device 2 holds a game application 4, character profiles 6, and is interfaced with the network 10. Character profiles 6 are records which track the game choices a player makes while playing the game application 4. The use of character profiles 6 is discussed further below. The network 10 may be the Internet, an Intranet, a local area network, a wide area network, a wireless network, or some other type of network. A user 12 accesses the network 10 through an electronic device 14 holding a web browser 16. Also interfaced with the network 10 are a number of secondary electronic devices 20, 26 and 32, such as web servers. Each secondary electronic device hosts a customized web site, 22, 28 and 34. Each customized web site includes business-related content 24, 30 and 36. The user 12 requests the initiation of the game application 4, and the game starts.

A game event re-directs the user 12 to one of the customized web sites 22, 28 and 34. While the user is at one of the customized web sites 22, 28 and 34, the user is exposed to the business-related content 24, 30 and 36. Game actions undertaken by the user 12 while at the customized web sites or at the primary electronic device 2 may cause the generation of player benefits. Some of the benefits are real-life benefits external to the game which may be accessed by the player after the conclusion of the game or by pausing the game. The real-life benefits are stored in a network-accessible database 39. The external real-life benefits may be things such as hotel guest reward points or frequent flyer miles for airlines. Those skilled in the art will recognize that additional business-related content 40 may be at other sites accessible over the network 10. Game benefit records 8 of benefits meant to be used within the context of the game are stored on the primary electronic device 2 executing the game application 4.

Figure 2:
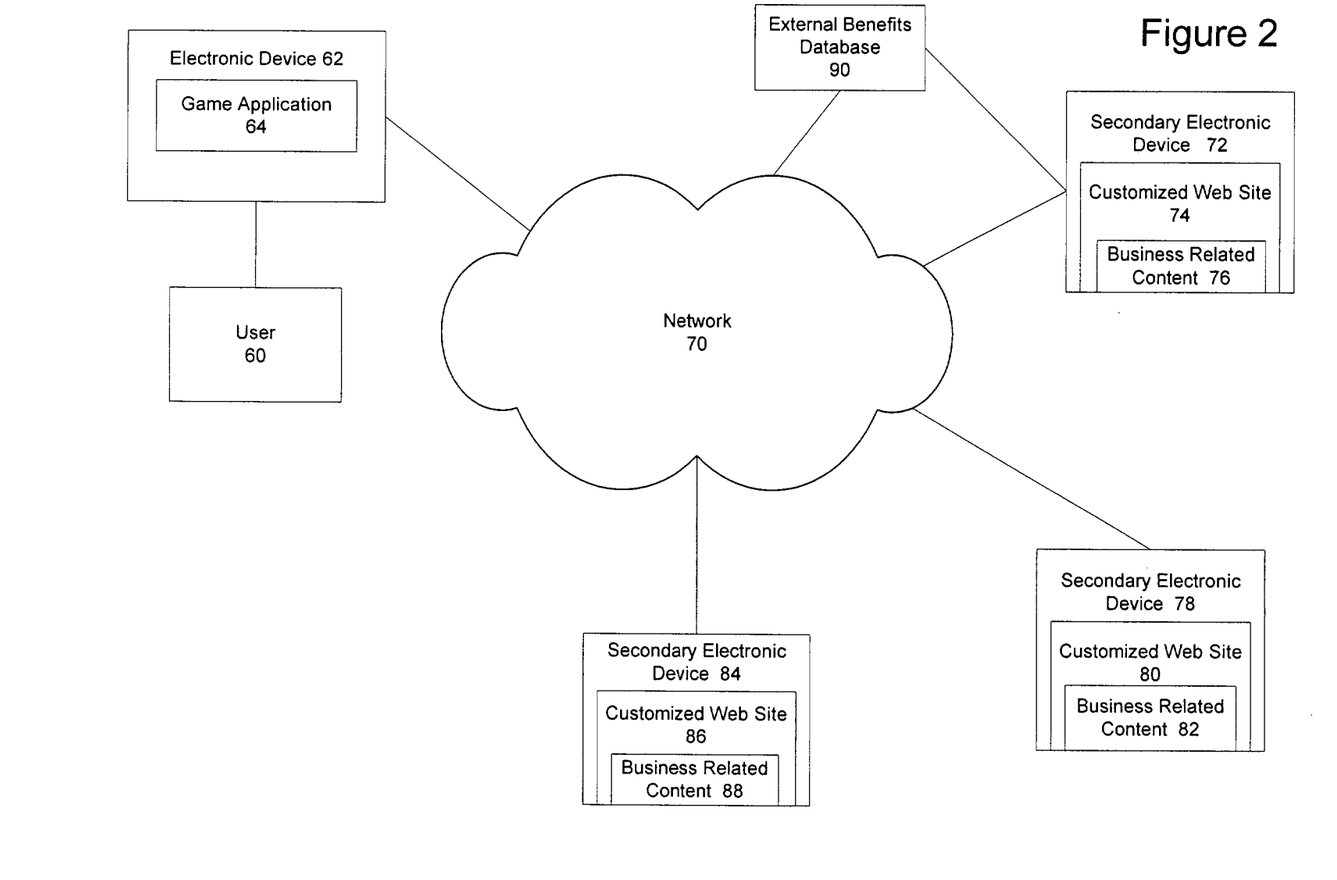
FIG. 2 depicts a block diagram of an alternate environment suitable for practicing the illustrative embodiment of the present invention where a local device holds the game application.

FIG. 2 depicts an alternative environment suitable for practicing the illustrative embodiment of the present invention. A user 60 accesses the game application 64 on a local electronic device 62. The local electronic device 62 may be a desktop computer, laptop computer, PDA, cellular phone or other device able to access the network 70. The local electronic device 62 is interfaced with a network 70. Also interfaced with the network 70 are a number of remote secondary electronic devices 72, 78 and 84. The secondary electronic devices 72, 78 and 84 each include a customized web page 74, 80 and 86. The customized web pages 74, 80 and 86 each hold business-related content 76, 82 and 88. Following initiation of the game application 64, the occurrence of a pre-determined event in the game causes a transparent re-direction to one of the customized web pages 74, 80 and 86. The web pages expose the user 60 to additional business-related content in the context of the ongoing game. Game actions undertaken by the user 60 may result in the generation of benefits for the user 60 which are to be used outside the game environment. Records of the external benefits may be stored in an external benefits database 90 accessible through one of the secondary electronic devices and over the network 70.

The game the user is playing may take many forms. The game may be a role playing game involving a geographic theme in which, for example, the player is exposed to data relating to the travel industry for a certain geographical area. Examples of this would be the player being exposed to data involving hotels, planes and restaurant information for a particular city. The player may be presented with a display of their virtual location as a 3-D virtual rendition, by a web-cam picture, by a map display (which may be provided by a sponsor) or some other visual rendering which indicates to the player the player's current location within a geography zone. Alternatively, the game may take the form of a scavenger hunt where a player is required to go to various places within the game environment and "retrieve" various items. The game may also involve an educational sequence of events such that the player's game actions also serve a dual purpose of educating the player in the use of technology for a particular company's infrastructure. The players may be required while at the external web sites holding the business-related content to answer questions or retrieve objects. The external company web sites are custom designed by business sponsors so that the data to which the user is exposed is relevant to the game-playing environment. The custom designed web sites may allow the user to pause the game and transfer to a non-game web site of a business sponsor. The games may be directly developed by the business sponsors thereby customizing the entire game playing experience in order to emphasize a particular subject for the player. Those skilled in the art will recognize that the game may take additional forms other than those listed herein without departing from the scope of the present invention.

Figure 3:
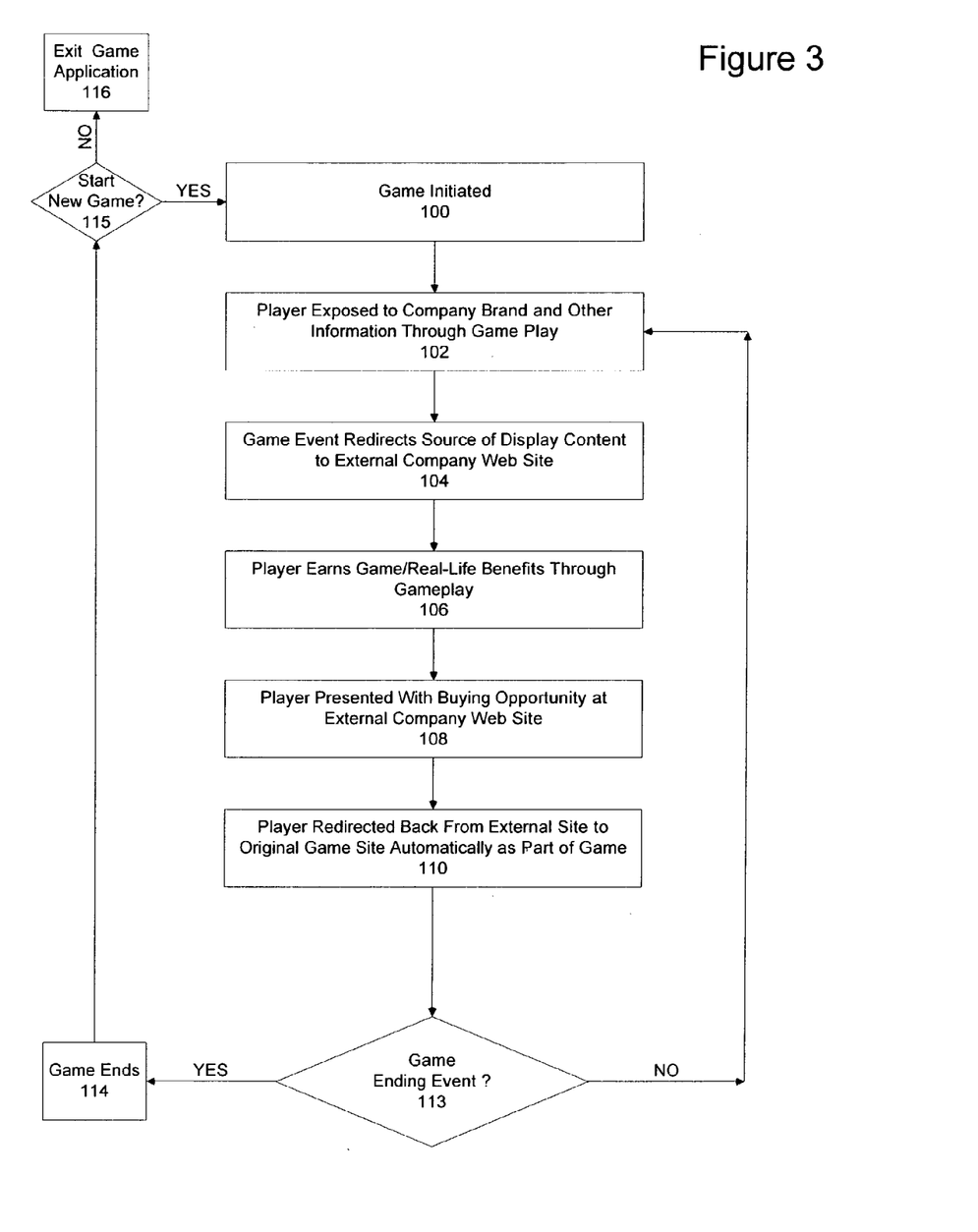
FIG. 3 depicts a flowchart of the sequence of steps followed by the illustrative embodiment of the present invention to expose the player to business-related content while the player is playing the game.

FIG. 3 is a flowchart of the sequence of steps followed by the illustrative embodiment of the present invention to expose a game player to business-related content through the execution of the game application. The sequence begins when the game is initiated (step 100). The player is exposed to company branding through player action during game play (step 102). Eventually, a game event re-directs the source of the content being displayed to the user to an external company web site (step 104). While at the external web site, the player may earn game or real life reward benefits (step 106). The events triggering the benefits are related to the business-related content to which the player is exposed. The content is displayed within the context of the game play. While at the external company web site the player may have the opportunity to purchase items at the external company web site either in the course of the game play or by pausing the game play and temporarily departing from the game site (step 108). Eventually, a predetermined event causes the player to be re-directed from the external web site back to the original game site (step 110). Back at the original game site the player continues to be exposed to selected data through game play. Eventually, if a player executes a game ending event (step 113) the game ends (step 114). At that point, the player must decide whether or not to restart the game (step 115). If the player elects to continue a new game is initiated (step 100). If the player elects not to restart the game, the game application is exited (step 116). Alternatively, if the action is not a game ending event (step 113), the player continues to be exposed to company branding through game play (step 102) and the overall sequence of events reiterates. Those skilled in the art will recognize that the sequence of events is not limited to a linear sequence described above, but can involve multiple re-directions back and forth to company web sites as part of the sequence of game events with the player being exposed to business-related content at multiple points in the process.

The business-related content to which the user is exposed may take a number of different forms. The content may be in the form of static web pages. Alternatively, the content may be in the form of web pages including dynamic content, which is constantly being updated through the use of, scripts, Java applets, ActiveX objects, or other similar mechanisms. An example of this is the display of a news crawl from a sponsoring news channel. Alternatively, the dynamic content may include real-life weather data for the geographic area the player is virtually experiencing in the game. Network-accessible databases of current weather reports, currency valuations, current events, airline schedules and similar subjects may be used to provide this information. The content to which the game player is exposed may include video and audio data. The exposure of the player to this data occurs in the context of the game. The player may also play the game in conjunction with one or more people in a multiplayer game and access a database of the other players progress in real-time. The game may be a long-term competition spanning days, weeks, months or longer periods. The user actions within the context of the game are evaluated either through a static decision tree or the use of an artificial intelligence engine to generate the next game event for the user. Events occurring at the external company web sites to which the player is re-directed are captured and sent back to the original game site so that long term records may be kept of the players progress and history. Those skilled in the art will recognize that additional forms of business-related data may be integrated into the game application without departing from the scope of the present invention.

In one aspect of the present invention, character profiles are developed which track the game decisions made by each player. Players log-in at the outset of game play using a player ID and password. The player is cross-indexed to a character profile which tracks the player's decisions during the course of the game. The character profiles may include non-identifying demographic data and may be exchanged with the business sponsors so that they can tailor content or product offerings in a manner appealing to the game participants. The profiles are tied to a character representing the player, not the actual individual playing the game.

The game application 4 allows the player to access more than task-oriented games. The application may present the user with a platform to access music sites (run by a sponsor), chat areas, reading area, educational areas, areas specific to sponsor reward programs, shopping areas and other areas in addition to the game area. The player may be allowed to view video clips or answer quiz questions. The choices made by the player are tracked, collected in the character profiles, and exchanged with business sponsors. The sites relating to the non-game selections are unique to the game application so that player choices may be tracked and added to the character profiles.

Figure 4:
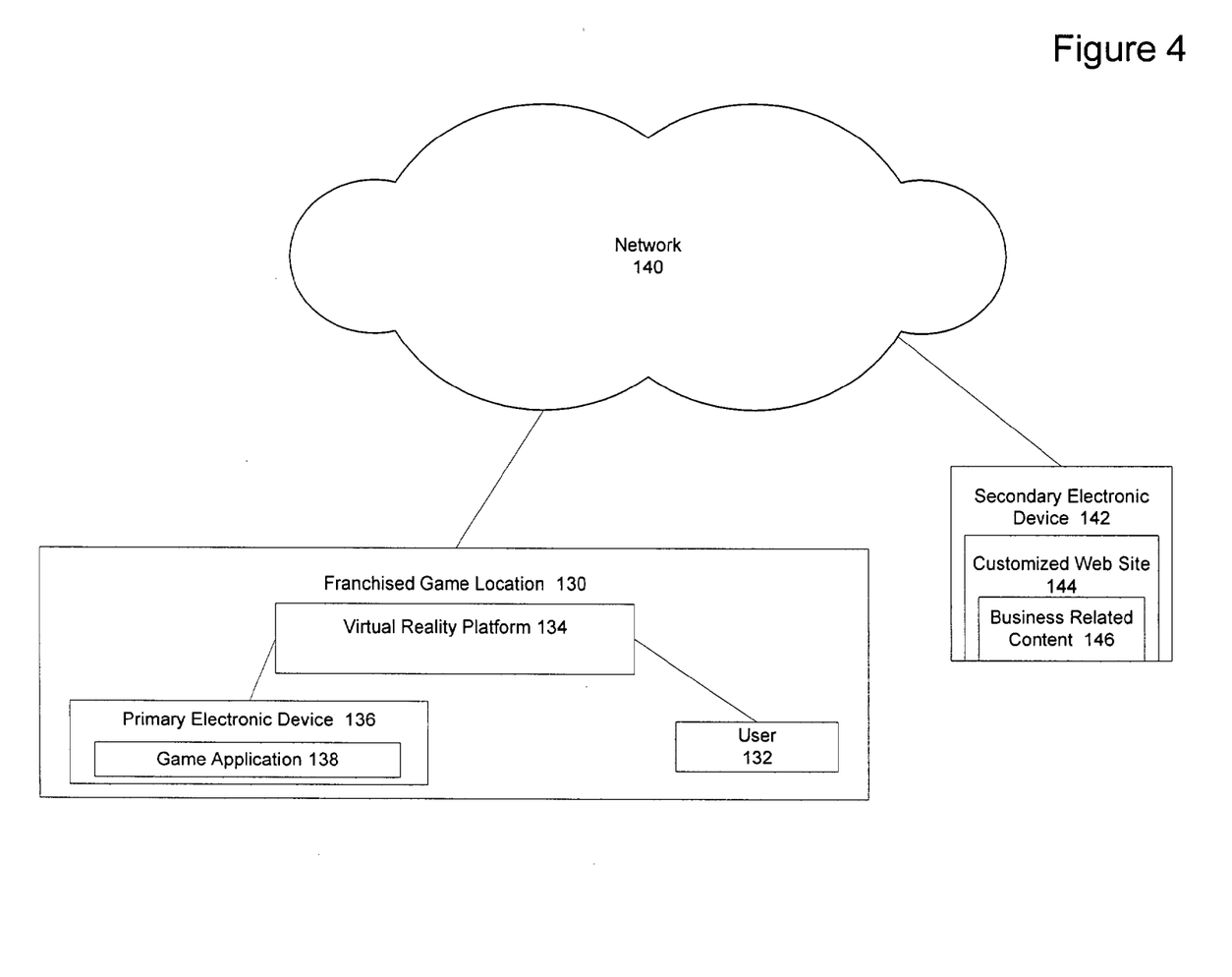
FIG. 4 is a block diagram of the illustrative embodiment of the present invention where a virtual reality platform is used at a franchised game location.

FIG. 4 depicts a block diagram of the game application using a virtual reality platform during the execution of the game. A user 132 goes to a franchised game location 130. The franchised game location 130 includes a virtual reality platform 134 allowing the user 132 to experience three-dimensional effects in an immersive environment. The virtual reality platform 134 is interfaced with the primary electronic device 136 holding the game application 138. The game location has access to a network 140 through which the user may be re-directed to a secondary electronic device 142 holding a customized web page 144. The customized web pate 144 holds business-related content to which the user 132 will be exposed during the course of game play.

Figure 5:
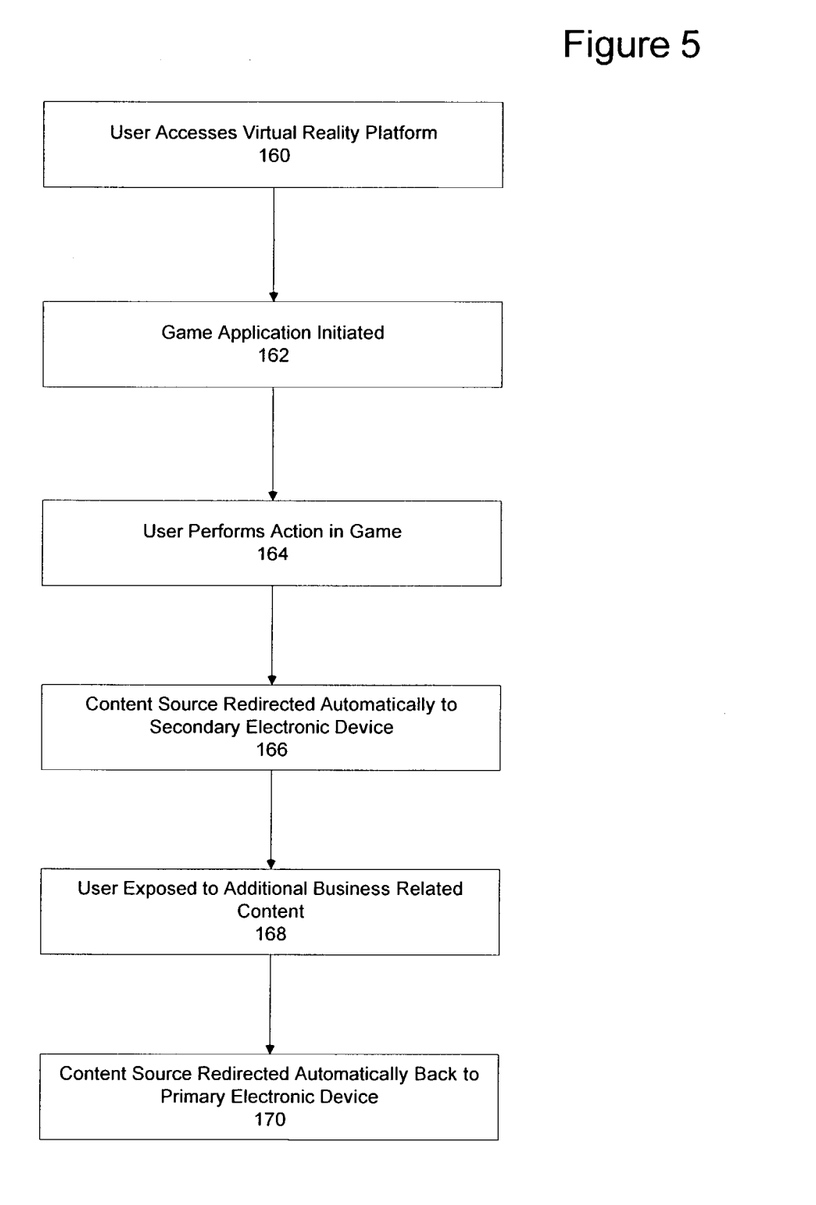
FIG. 5 is a flowchart of the sequence of steps followed by the illustrative embodiment of the present invention to utilize a virtual reality platform during the execution of the game application.

FIG. 5 depicts the sequence of events by which the illustrative embodiment of the present invention utilizes a virtual reality platform to increase the user experience. The sequence begins when the user accesses the virtual reality platform (step 160). The game application is initiated (step 162). The user performs actions in the game (step 164). One of the events in the game causes the source of the content being displayed to the user through the virtual reality platform to be automatically re-directed to a secondary electronic device (step 166). At the secondary electronic device, the user is exposed to additional business-related content (step 168). Following the conclusion of a pre-determined task or event at the secondary electronic device, the content source is re-directed automatically back to the original game site (step 170). During this time the user is experiencing the displayed data through the three dimensional effects of the virtual reality platform 134.

The illustrated embodiment of the present invention anticipates the generation of both two-dimensional and three dimensional image data for the user by the game application. In the network environment where the user is accessing the game application through a local web browser with the game application being stored on a remote site on the network, the user may receive two-dimensional data through the web browser. In such a case, the web page is retrieved to the local web browser and the graphics are rendered locally prior to displaying the page to the user. It is also anticipated within the scope of the present invention that for users with broadband connections that are able to handle the greater data broadcast requirements, three dimensional data may be received from the remote site holding the game application. In such a case, the external site renders the three dimensional graphics and forwards the three-dimensional data to the local device being used by the user over a high capacity connection such as a cable modem line, DSL line, T1 line, or optical line. Three-dimensional images will then be displayed to the user. In one aspect of the invention the three-dimensional images which are rendered at the external site may be compressed prior to being sent over the network.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, although web sites have been listed herein as the repository of the business-related content on the secondary electronic devices, those skilled in the art will recognize that other locations may be used to hold business-related data without departing from the scope of the present invention. Practitioners of the art will realize that the sequence of steps and architectures depicted in the figures may be altered without departing from the scope of the present invention and that the illustrations contained herein are singular examples of a multitude of possible depictions of the present invention.

I claim:

1. A method of integrating business-related content over a computerized network, into a primary electronic device that accesses a game application, from at least one secondary electronic device that accesses business-related content on a plurality of web pages, the method comprising:
   receiving a request at said primary electronic device to initiate a locally executed game application that is accessible at said primary electronic device, from a user interfaced with said network;
   initiating said game application at said primary electronic device;
   automatically integrating business-related content from at least one of said web pages of said secondary electronic device into said locally executed game application during execution of said game application;
   automatically re-directing said user to one of said web pages of said secondary electronic device from said primary electronic device, said re-direction being integrated into said game application and said re-direction occurring as part of the user executing said game application; and
   executing a user action on said business-related content from said secondary electronic device.

2. The method of claim 1 wherein said user purchases an item from a vendor associated with said business-related content on said at least one customized web page.

3. The method of claim 1 wherein said game application displays branded business-related content to said user.

4. The method of claim 3 wherein said branded business-related content is dynamically updated.

5. The method of claim 1, comprising the further steps of:
   executing game-related user actions in said game application as a result of user choices; and
   generating a player profile based on said user choices made during said game application;
   wherein the player profile is specific to said user.

6. The method of claim 5 wherein said player profile is disseminated to providers of business-related content used in said game application.

7. A method of automatically integrating content into an electronic device over a computerized network, comprising:
   receiving a request from a user at a primary electronic device to initiate at least one of a plurality of locally executed applications that are accessible to said primary electronic device interfaced with said network;
   initiating said at least one of said plurality of applications at said primary electronic device;
   providing at least one customized web page at a secondary electronic device, accessed over said computerized network by said primary electronic device, said web page being customized with content for use with said one of said plurality of applications;
   automatically integrating said content from said secondary electronic device into said at least one of said plurality of locally executed applications during execution of said at least one of said plurality of applications;
   automatically re-directing said user to one of said customized web pages at said secondary electronic device, from said primary electronic device, said re-direction being integrated into said one of said plurality of applications and said re-direction occurring as part of the user executing said one of said plurality of applications; and
   executing a user action on said content from said secondary electronic device, said user action generating a benefit for said user relating to said content.

8. The method of claim 7, wherein said content includes dynamic content.

9. The method of claim 7, further comprising:
   providing a virtual reality platform interfaced with said primary electronic device, said virtual reality platform providing a three-dimensional visualization in which the user interacts.

* * * * *